United States Patent [19]
Phillips

[11] Patent Number: 5,106,055
[45] Date of Patent: Apr. 21, 1992

[54] DYNAMIC DOUBLE ACTION VALVE

[76] Inventor: Edwin D. Phillips, 170 Albert St., N. Plainfield, N.J. 07060

[21] Appl. No.: 610,251

[22] Filed: Nov. 8, 1990

[51] Int. Cl.$^5$ .............................................. F16K 31/44
[52] U.S. Cl. ...................................... 251/264; 74/531; 74/424.8 B; 137/614.2
[58] Field of Search ................. 251/264, 265, 84, 215, 251/216; 74/531, 424.8 B, 424.8 VA

[56] References Cited

U.S. PATENT DOCUMENTS

| | | | |
|---|---|---|---|
| 3,409,271 | 5/1966 | Kallenbach | 251/265 |
| 4,483,512 | 11/1984 | Drapeau | 251/265 |
| 4,601,310 | 7/1986 | Phillips | 137/556 |
| 4,687,181 | 8/1987 | Simonelli et al. | 251/264 X |
| 4,907,780 | 3/1990 | Phillips | 251/214 |
| 4,917,355 | 4/1990 | Dark et al. | 251/264 X |

Primary Examiner—Martin P. Schwadron
Assistant Examiner—Kevin L. Lee
Attorney, Agent, or Firm—Shoemaker and Mattare, Ltd.

[57] ABSTRACT

A valve includes a hollow body having both a valve seat, and a threaded portion having helical right-handed threads. A stem disposed within the body has a threaded portion at one end, with left-hand threads. The stem is moved within the body by turning a cap assembly which has both a left-hand threaded portion engaging the threaded portion of the stem, and a right-hand threaded portion engaging the threads on the valve body. Large stem displacements per turn are realized.

11 Claims, 5 Drawing Sheets

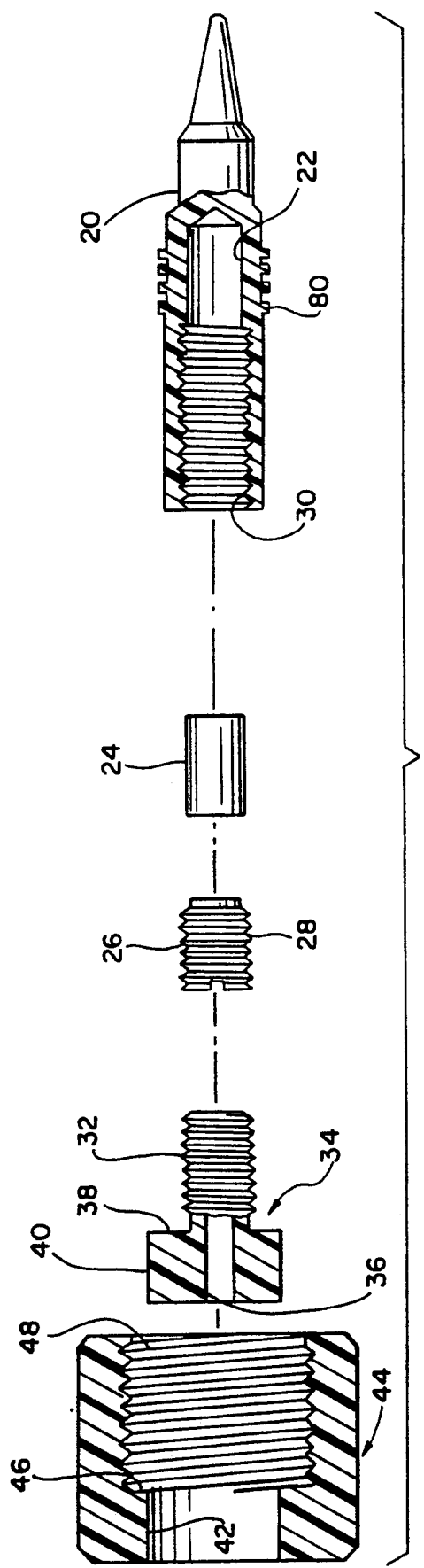
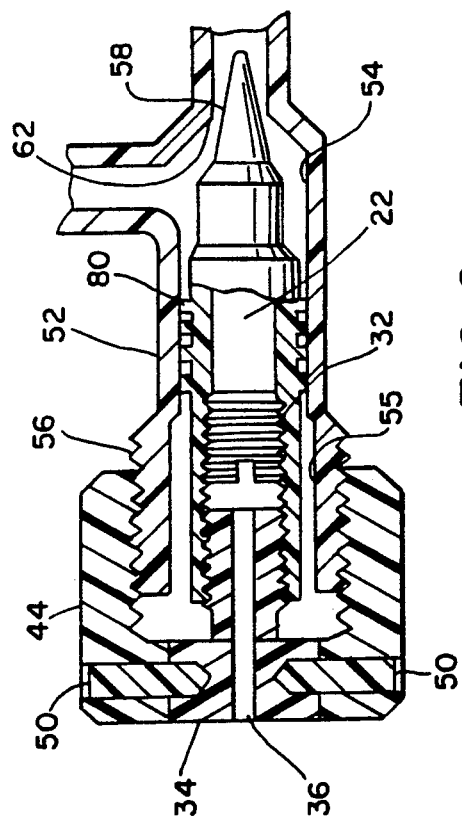
FIG. 1.
FIG. 2.

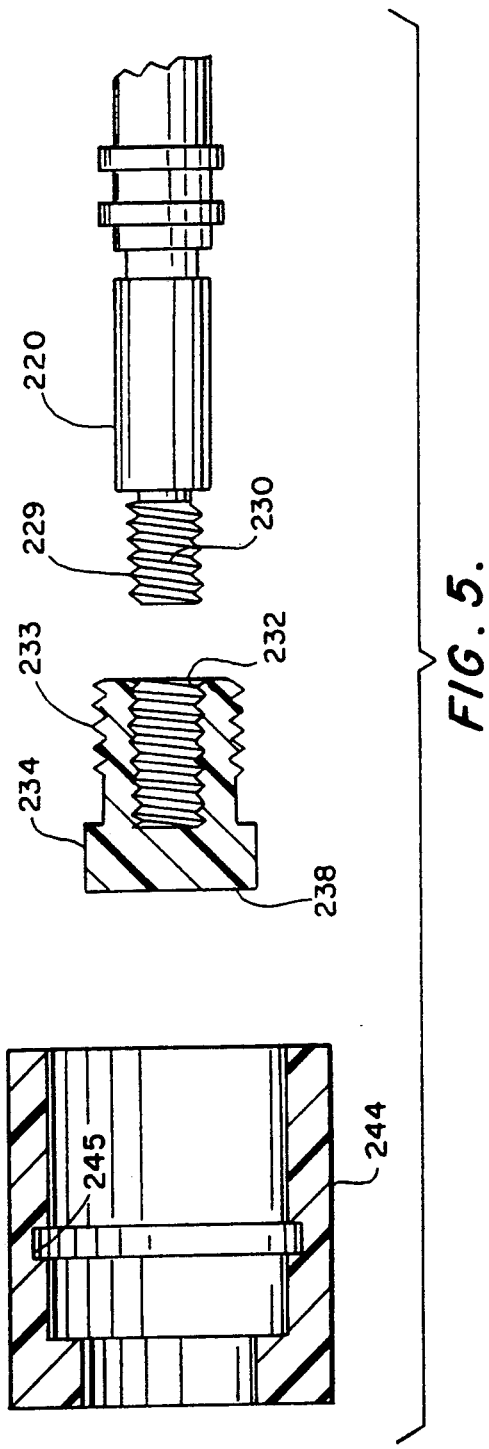
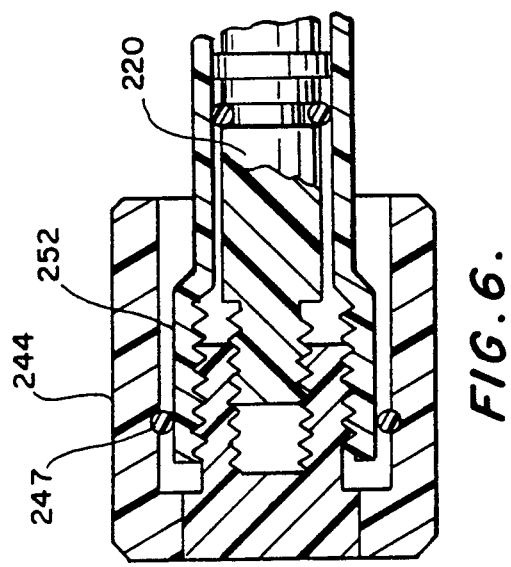
FIG. 5.
FIG. 6.

DYNAMIC DOUBLE ACTION VALVE

BACKGROUND OF THE INVENTION

This invention relates to the art of valving, particularly to a valve having a rotatable handle for operating an axially movable stem. Examples of such valves are in the present applicant's prior patents, U.S. Pat. No. 4,601,310 and U.S. Pat. No. 4,907,780.

In valves of this type, it is common to provide the handle and/or the stem with helical threads, to convert rotary motion of the handle to linear motion of the stem, and to provide force multiplication. In cases where great force multiplication is not necessary, however, the threaded mechanism can provide objectionably slow response, so that many turns of the handle are necessary to open or close the valve. This invention is directed at increasing the actuating speed of such a valve.

SUMMARY OF THE INVENTION

It is the object of this invention to have a valve in which a small angular rotation of the handle will cause a large linear movement of the valve stem. It is also desirable in handling dangerous materials to have a safety feature to prevent an operator from accidentally opening the valve too far thereby releasing dangerous chemicals. Also with the same feature the valve stem can be removed and replaced without shutting down the whole system.

Another objective is to allow a larger fluid flow past the valve end with the least turbulence and resistance as possible, also to produce a hollow valve stem and angled sided "O" ring grooves to allow the greatest amount of "O" ring sealing pressure possible.

It is also an object of this invention to have a combination valve suitable for both high vacuum application or in-applications with highly corrosive chemicals using the same valve stem.

These and other objects are realized by a valve including a hollow body having both a valve seat, and a threaded portion having helical right-handed threads. A stem disposed within said body has a threaded portion at one end, with left-handed threads. The stem is moved within the body by turning a cap assembly which has both a left-hand threaded portion engaging the threaded portion of the stem, and a right-hand threaded portion engaging the threads on the valve body. Friction between the sealing portions of the stem and the bore of the valve body keep the stem from turning as the cap is turned, so that the displacement of the stem is the sum of relative movements between the cap and the stem, and between the cap and the body.

BRIEF DESCRIPTION OF THE DRAWINGS

In the accompanying drawings,

FIG. 1 is a exploded sectional view of a valve embodying the invention, taken along a longitudinal plane of the valve, FIG. 2 is a corresponding, unexploded view of the valve installed in a body, FIG. 5 is an exploded view of a second modification of the invention, FIG. 6 is an unexploded view thereof.

DESCRIPTION OF THE PREFERRED EMBODIMENT

Figure 3:
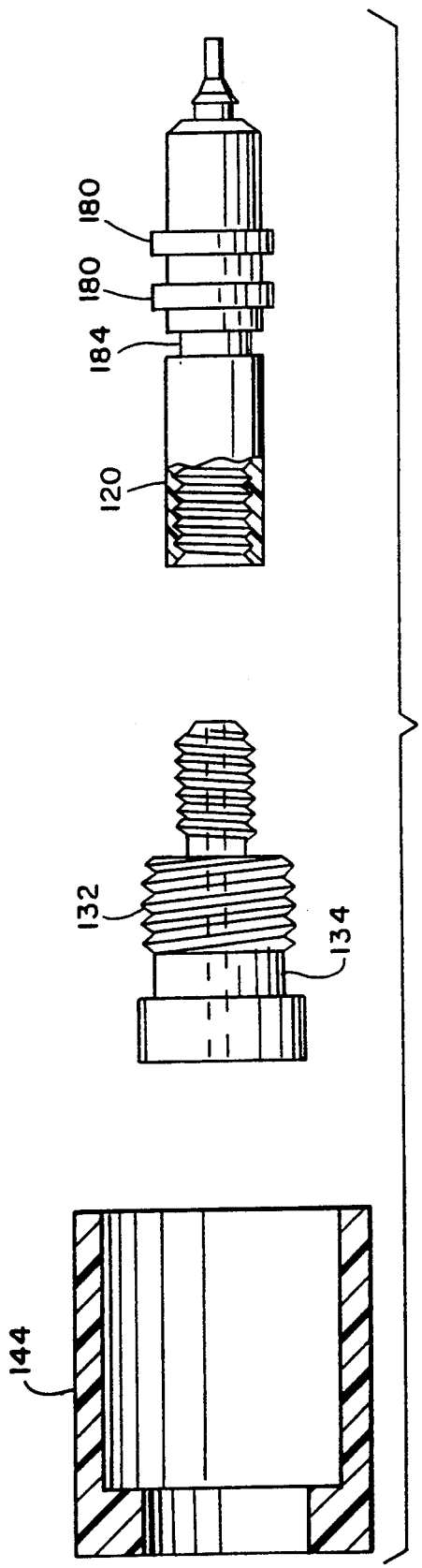
FIG. 3 is an exploded view of partial section of a first modification of the invention.

As shown in FIG. 1, a valve embodying the invention includes a valve stem 20 having a hollow interior 22 which receives an expansion pad 24. The pad is retained within the stem by means of an expansion bushing 26 having an exterior left-hand thread 28 that engages a corresponding thread 30 inside the valve stem. The same thread 30 also receives a threaded end 32 of a bushing 34, which has a through hole 36 that permits tool access for adjustment of the expansion bushing. The bushing 34 has a head 38 with an outside diameter 40 substantially equal to the inside diameter 42 of a cap 44 which has a counterbore 46 with a right-hand internal thread 48.

As shown in FIG. 2, the head of the bushing 34 is connected to the cap 44 by means of a pair of pins 50 that extend through aligned bores in the cap and the bushing head. The cap, stem and bushings so assembled are referred to hereafter as the valve stem assembly. This assembly is installed on a glass body 52 having a smooth interior bore 54, and exterior right-hand threads 56 matching those of the cap. At the far right end of the figure, the nose 58 of the stem is shown extending through an opening in the body defined by an annular seat 62.

Figure 4:
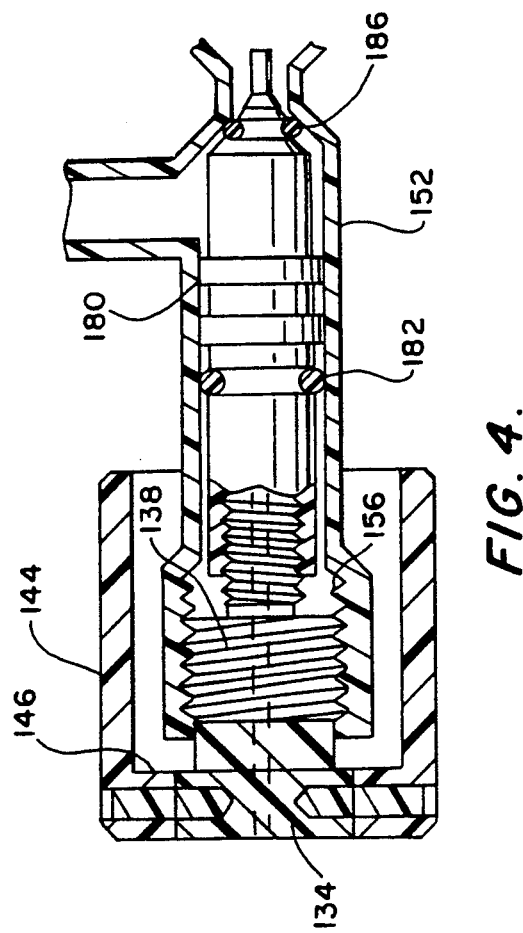
FIG. 4 is an unexploded view thereof.

FIGS. 3 and 4 shows a second version of the invention, wherein the threads 156 on the body 152 are internal rather than external. Here, the bushing 134 has external threads 132 which engage those on the body, and the cap 144, while still pinned to the bushing head, lacks any threads in its counterbore 146.

In either version of the invention, the valve stem is preferably made of an inert, somewhat deformable polymer such as PTFE. For corrosive chemical applications, only the ribs 80 (FIGS. 1–2) or 180 (FIGS. 3–4) provide sealing against the body bore. In other applications, an O-ring 182 (FIG. 4) may be fit into a groove 184 (FIG. 3) provided for that purpose. Likewise, the O-ring 186 may be installed on the nose of the stem, depending on the environment. In any event, it is improtant that there be a tight fit between the stem and the interior of the body bore. This fit is necessary not only to produce proper sealing, but also to prevent the stem from rotating with the cap as the latter is turned. If the stem is too loose, it will rotate with the cap, defeating the function of the interior threads.

FIGS. 5 and 6 show another modification of the invention, wherein the stem 220 has a protruding portion 229 with an external left-hand thread 230 which is received in a bushing 234 having an internal left-hand thread 232 and an external right-hand thread 233. The bushing 234 has an unthreaded head 238, similar to that in FIG. 1, and is pinned to the cap 244. Note the O-ring groove 245, and O-ring 247, which seals against the outer surface of the body 252.

Figure 7:
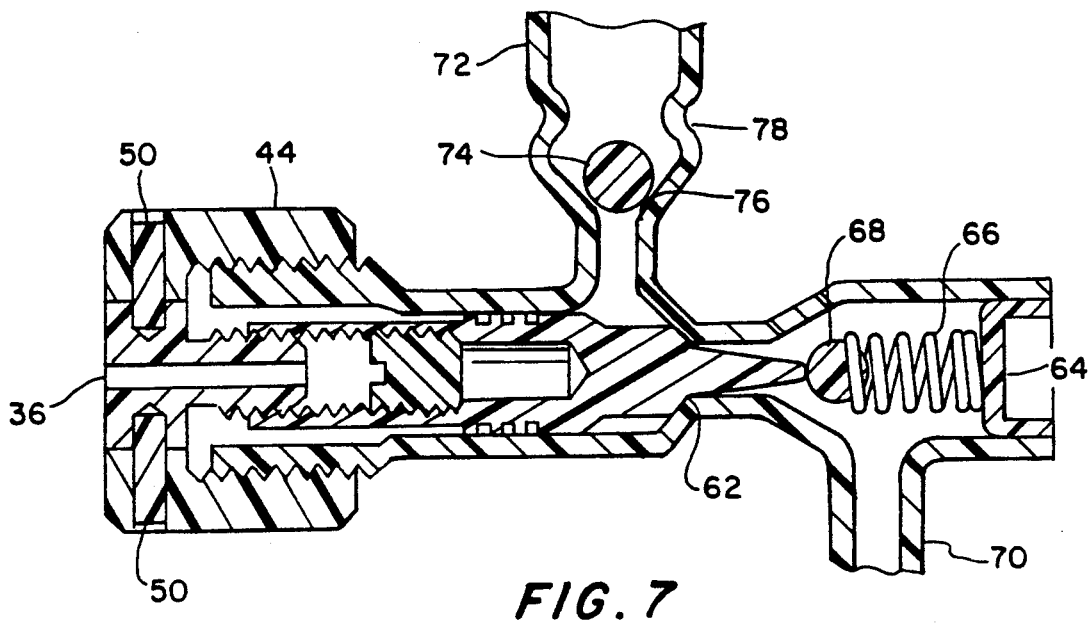
FIG. 7 is a sectional view of the invention of FIG. 2, showing additional details.

FIG. 7 illustrates the valve of FIG. 2, showing further details of the glass body. To the right of the valve seat 562, a plug 64 is installed in the open end of the body; the plug retains a spring 66 and ball 68, the ball being biased against the nose of the stem by the spring. The body has a downwardly extending outlet 70. The upwardly extending lateral inlet 72 shown also contains a ball 74, which seats in a frustoconical portion 76 of the inlet. The circumferential ridge 78 retains the ball in the inlet.

Figure 8:
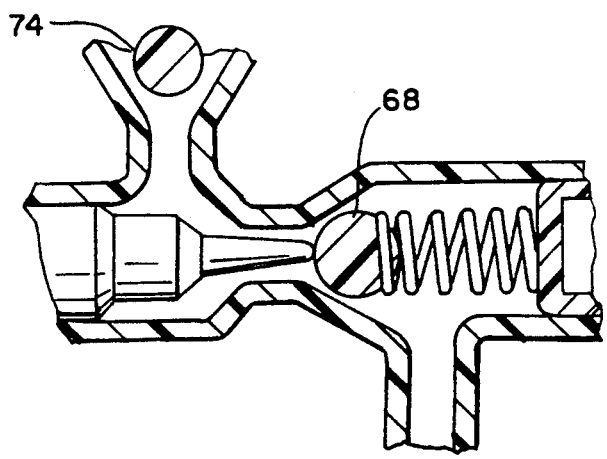
FIG. 8 shows a portion of FIG. 4, with its ball valves unseated.
Figure 9:
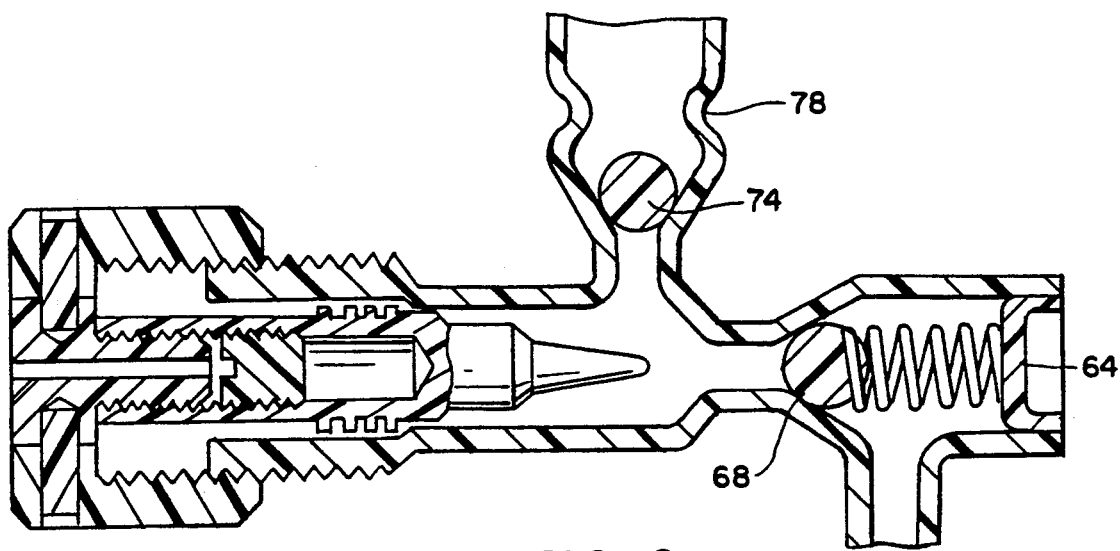
FIG. 9 shows the invention of FIG. 4, with the ball valves seated.

FIG. 8 shows the valve with both balls open, and the stem almost seated. FIG. 9 shows the valve in its safety mode, with both balls seated, and the stem withdrawn.

The valve is assembled by pinning the right hand threaded cap to the left hand threaded bushing. The expansion pad is inserted into the stem interior, and the pad adjusting bushing is threaded into the valve stem and loosely tightened (this threaded bushing may be adjusted later if required for a good seal.) The assembled valve stem is then screwed on to the left hand threaded bushing. This assembly is then screwed on to the left hand threaded bushing and run up to the shoulder of the right hand threaded cap. In this position, the assembly is put into the glass valve body and the right hand threaded cap is turned to engage the thread for one or two turns. By design, as shown in FIG. 9, the valve stem sealing surface just engages the valve body internal precision bore sealing surface.

When these two surfaces meet, there is high friction due to the interference fit between the two sealing surfaces, causing the valve stem to stop rotating. At this point, the continued turning of the right hand thread cap causes the left hand threaded bushing to unscrew from the valve stem. This combination of movements produces an extremely large linear movement of the valve stem for a small angular rotation of the cap. The exact magnitude of movement depends on the pitch of the right hand thread plus the pitch of the left hand thread.

It is possible to make a double-fluted right hand thread and a double-fluted left hand thread, each having twice the lead of a single-fluted thread, which would produce an extra fast acting valve stem.

An important feature of this valve is that the cap and the stem act independent from each other. Therefore, the stem does not rotate but slides back and forth as the cap is rotated. This reduces the wear and produces better sealing.

Another feature of this valve is the ease of assembly. In previous valves because of space restrictions, the sealing surface of the valve stem had to be inserted into the sealing bore of the valve body before the thread cap engaged the threaded valve body. The high friction between these surfaces require a great deal of force to insert the valve stem past this point to where the threads of the cap could be engaged with the threads of the valve stem. This is especially true with the large diameter valves. This problem is solved with this design since the threads are engaged before the high friction occurs and the mechanical advantage of the thread allows the assembly to be accomplished easily. This, in combination with the safety feature of the valve, allows the assembly of the valve stem assembly to be installed or replaced without shutting off the whole system and without the fear of breakage.

Figure 10:
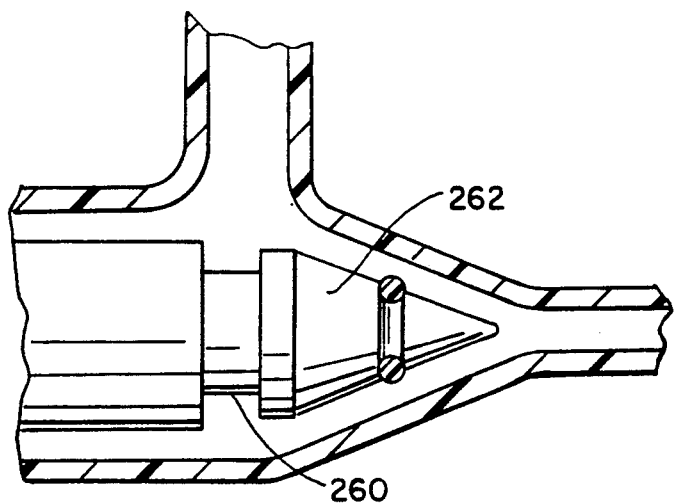
FIGS. 10 and 11 show another variation of the valve stem.
Figure 11:
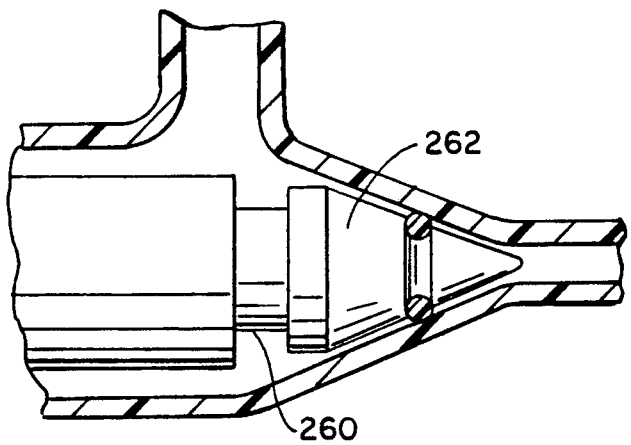

FIGS. 10 and 11 show a valve stem with an undercut 260 behind the shut off cone 262 of the valve stem. This space acts like an accumulator for the fluid as it flows around the back side of the shut off cone. This allows a more uniform flow around the cone producing less turbulence and friction, thus allowing freer and greater flow through the valve ports.

Figure 12:
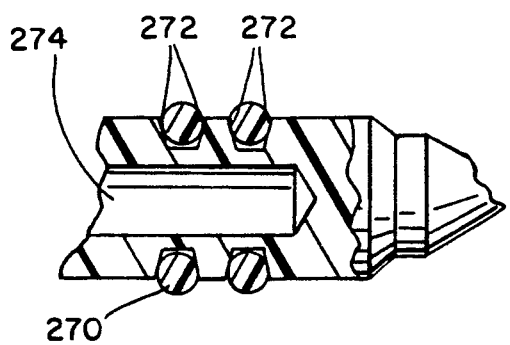
FIG. 12 is a fragmentary view in partial section of a further variation of the valve stem.

FIG. 12 shows a hollow valve stem which allows a much higher deformation of the sealing "O" rings 270 without danger of breaking the glass body. The multiple "O" ring seals are set into deep, angle sided grooves 272. The bore 274 forming the center of the valve stem hollow weakens the section adjacent to the angled grooves. The sealing pressure can be increased by increasing the deformation of the "O" ring up to the point of compression. The angled groove forms a wedge so that as the pressure is increased, the weakened section of the valve stem because of the hole with be deformed by the wedging action of the "O" ring. This then becomes sort of a relief valve and prevents excessive pressure being exerted on the glass body. This produces extremely high sealing pressure without causing breakage of the glass body.

The preferred hand (i.e., right or left) of the threads is indicated in each of the embodiments. The directions specified produce the normal result of closing the valve as the cap is turned clockwise. However, the valve would work equally well if the hand of each thread were reversed, only the valve would now open when turned clockwise. Hence, in claim 1 below, the particular hand of each thread is defined only as opposite its counterpart.

Preferred materials have been indicated above; however, appropriate other materials could be used, depending on the application. The choice of materials is considered to be within the skill of the art.

Inasmuch as the invention is subject ot modifications and variations, it is intended that the foregoing description and the accompanying drawings shall be interpreted as illustrative of only one form of the invention, whose scope is to be measured by the following claims.

I claim:

1. A valve comprising
   a hollow body having both a valve seat, and a threaded portion having right-hand helical threads,
   a stem disposed within said body, said stem having means at one end for engaging and sealing against said seat, and a threaded portion at its other end, said threaded portion having left-hand helical threads, and
   a cap assembly for producing axial movement of said stem in response to rotation of the cap assembly, said cap assembly having a right-hand helically threaded portion engaging the threaded portion of said stem, and a left-hand helically threaded portion, engaging the threads on said valve body,
   wherein said stem is hollow, and said threaded portion of said stem comprises an internal thread within said stem.

2. The invention of claim 1, wherein said said right-hand threads on the cap assembly are external threads.

3. The invention of claim 1, wherein said right-hand threads on the cap assembly are internal threads.

4. The invention of claim 1, wherein said cap assembly comprises a bushing with right-hand threads formed thereon for mating with the threads on said stem, and a cap connected to said bushing.

5. The invention of claim 4, wherein said cap has a counterbore surrounding said bushing.

6. The invention of claim 5, wherein said counterbore is provided with internal right-hand threads for engaging the threads on said body.

7. A valve comprising
a hollow body having both a valve seat, and a threaded portion having right-hand helical threads,
a stem disposed within said body, said stem having means at one end for engaging and sealing against said seat, and a threaded portion at its other end, said threaded portion having left-hand helical threads, and
a cap assembly for producing axial movement of said stem in response to rotation of the cap assembly, said cap assembly having a right-hand helically threaded portion engaging the threaded portion of said stem, and a left-hand helically threaded portion, engaging the threads on said valve body,
wherein said stem is hollow, and has a sealing surface thereon for engaging the interior surface of said body, and further comprising a packing and means for compressing the packing within the stem, to expand the stem and increase the sealing force between the stem and the body.

8. The invention of claim 7, wherein the stem has at least one O-ring groove formed in said sealing surface, and a O-ring installed in said groove.

9. The invention of claim 8, wherein said groove has diverging sides.

10. A valve comprising
a hollow body having a valve seat, a smooth bore, and a threaded portion having right-hand helical threads,
a stem disposed within said bore, said stem having a head at one end for engaging and sealing against said seat and a threaded portion at its other end, said threaded portion having left-hand helical threads, and
a cap assembly for producing axial movement of said stem in response to rotation of the cap assembly, said cap assembly having a right-hand helically threaded portion engaging the threaded portion of said stem, and a left-hand helically threaded portion, engaging the threads on said valve body, and
a resilient stem seal between said stem and said smooth bore, said seal being sufficiently tight to prevent said stem from rotating when said cap is rotated, and said seal being the only means for preventing stem rotation.

11. The invention of claim 10, wherein said smooth bore has a portion of enlarge diameter at the threaded end of the body, to facilitate insertion of the stem and stem seal into said smooth bore.

* * * * *